United States Patent [19]

Finfrock et al.

[11] Patent Number: 5,592,379

[45] Date of Patent: Jan. 7, 1997

[54] METHOD AND APPARATUS FOR POOLING AND DISTRIBUTING BOND DIVIDENDS

[76] Inventors: Dale B. Finfrock, 221 Park Ave.; A. René Dervaes, Jr., 246 Esplanade Way, both of Palm Beach, Fla. 33480; Robert S. Dervaes, 11 Edgehill Ct., Bel Air, Md. 21014

[21] Appl. No.: 319,253

[22] Filed: Oct. 6, 1994

Related U.S. Application Data

[63] Continuation of Ser. No. 867,415, Apr. 13, 1992, abandoned.

[51] Int. Cl.$^6$ ................................................. G06F 15/00
[52] U.S. Cl. ........................... 395/239; 395/240; 395/242
[58] Field of Search ...................................... 364/401, 406, 364/408

[56] References Cited

U.S. PATENT DOCUMENTS

| | | | |
|---|---|---|---|
| 5,025,372 | 6/1991 | Burton et al. | 364/406 |
| 5,214,579 | 5/1993 | Wolfberg et al. | 364/408 |

OTHER PUBLICATIONS

Kichen; "Ghouls' Pools"; *Forbes*; Mar. 16, 1992; p. 19; Dialog: File 16, Acc# 03665040.
Reeves, Kumberly; "Risks, Methods of Retirement Investments Vary"; *Houston Business Journal*; v23 n10 p23(3); Jul. 26, 1993; Dialog # 14244196 (file 648).

Primary Examiner—Donald E. McElheny, Jr.
Assistant Examiner—Stephen R. Tkacs
Attorney, Agent, or Firm—Malin, Haley, DiMaggio & Crosby, PA

[57] ABSTRACT

The instant invention is a method and apparatus for administering a program to senior citizens for managing and distributing the interest from pooled government bonds or the like. The program derived around a bond fund unit of various security offerings to specific groups of senior citizens having a common age and financial goal. As long as the participant is alive, the participant will share equally in an increasing income stream derived from the interest from the security due to the number of decreasing participants in a fixed pool based on the participant's initial investment. The income producing bonds jointly pooled and singularly administered based upon U.S. Treasury bonds whose resulting interest is distributed to the remainder of living participants while bond maturity value remains payable to the participant or their estate. The program aids the participants and managers involved with the program regarding Fund assets, statistical predictions, and dividend distribution.

5 Claims, 3 Drawing Sheets

METHOD AND APPARATUS FOR POOLING AND DISTRIBUTING BOND DIVIDENDS

This is a continuation of application Ser. No. 07/867,415, filed Apr. 13, 1992 now abandoned.

FIELD OF INVENTION

This invention relates to the field of financial securities for senior citizens and, in particular, to a program assisting in the administration and distribution of interest derived from pooled U.S. Treasury Bonds or minicipal bonds.

BACKGROUND

By the year 2020 it is anticipated that 1 out of every 4 U.S. citizens will be at least 65 years of age. For this reason a number of financial programs are now available specifically directed to senior citizens for the purpose of providing steady income during retirement. Steady income throughout retirement year helps prevent the retired individual from becoming a financial burden upon their children should they outlive their assets. However, if the retiree relies upon a fixed income, the possibility exists that inflation will depreciate the fixed income to a level that may quickly consume their net worth. In an effort to forego such a possibility, numerous programs have been developed to insure the retiree's income.

Conventional passbook saving accounts, certificate of deposits, or bond purchases maintained by an individual provide a predictable flow of income but do not provide a means for maintaining pace with inflation. Similarly, numerous annuity offerings are made available providing the recipient the right to receive fixed periodic payment either for life or for a term of years. Annuities include bonds, trust contingent, deferred group, joint, life, private, refund, retirement, straight, and variable to name a few. The payments represent a partial return of capital and return of interest.

Insurance is a program generally made operative by death providing the beneficiary with proceeds upon occurrence. For a couple in retirement, a spouse typically collects proceeds upon the death of the spouse. Insurance can also be used to provide protection for uncertain costs. U.S. Pat. No. 4,642,768, 4,722,055 and 4,752,877 issued to Robert's discloses a method and apparatus for funding future liability of uncertain costs. The program allows the investor to fund a fairly certain future cost such as a child's college education as well as estimate the expected cost of the liability, when the liability will incur, and the amount of insurance necessary to cover the liability.

What cannot be predicted is how long an individual will live. Therefore, what is needed is a means for providing a senior citizen with a predictable income as well as a means for providing the individual with a statistically method of increasing that income during the remaining lifetime of the individual.

SUMMARY OF THE INVENTION

The instant program is a closed end non-diversified investment pool organized for the purposes of investing in and holding to maturity a fixed portfolio of thirty-year U.S. Government bonds or the like capable of providing 100% investment security. The program is based upon statistics as the Department of Health and Human Services indicates that the life expectancy of a 60 year old male or a 65 year old female is approximately 18 years and the life expectancy of a 70 year old male or a 75 year old female is approximately 12 years, according to 1988 records. From this statistic a preferred embodiment of the program is based upon a minimum number of investors having a particular birth year. To insure that participants in a particular pool have at least a reasonable approximation of the estimated longevity, no pool is formed with fewer than two hundred participants.

Under the program, dividends from the pooled interest is distributed among those unit holders submitting personally endorsed coupons with signature guaranteed by a bank or a member of the New York Stock Exchange during the last six months of the year preceding such dividend. The effect of such requirement is to limit dividend distribution to living participants. Accordingly, the interest of each investor from their bonds is limited to that share of such income allocated to his or her pool. The right to the dividend will terminate upon the participants death and is not transferable or payable to his or her estate, heirs or assignees.

Individuals who participate and survive their fellow participants have the potential for sharing in an increased share of the portfolio interest. In the event all investors in a particular birth year\amount invested bracket should die before maturity of the bonds, the bonds are sold and the net proceeds distributed to the estate, heirs or assignees of the original investors. The investment of unit holders principal is not affected by death, for upon liquidation of the Fund, each investor or his estate or designate is expected to receive an amount more or less equal to his or her original investment.

Accordingly, the program's principal purpose is to provide a source of income to meet the increasing expenses of those investors who live extended lives. This objective will be met by terminating the right of any investor who dies in the interim provided by the bond portfolio, thereby increasing the amount of Funds available for distribution to surviving investors.

Income from the portfolio bonds will be divided in or up to twelve pools, for example; ten thousand dollar investments by men born in 1921 or 1922 and women born in 1916 or 1917 will be placed in one pool, as such men and women have approximately the same life expectancy. Twenty-five thousand dollar investments by such persons will be placed in a second pool. Ten thousand dollar investments by men born in 1923 or 1924 and women born in 1918 or 1919 will be placed in a third pool. Twenty-five thousand dollar investments by such persons will be placed in a fourth pool; and so on for men and women born in each of the three subsequent two-year periods, according to the amount invested. However, to provide statistical equality, unless two hundred or more individuals from the same applicable two-year bracket subscribe to the same amount during the period of the offering, all subscriptions of that amount from individuals in such bracket will be returned.

Interest from the Fund's portfolio bonds is allocated among the different categories of investors according to birth year and amount invested, pro rata, and then distributed among the investors in each sub-category who have timely submitted a personally endorsed coupon. Accordingly, each unit holder will participate only in the interest attributable to investors in his or her birth year and amount invested bracket, and then only to the extent that he or she submits a personally endorsed coupon, with signature and date guaranteed. The United States Treasury currently pays interest semi-annually on bonds similar to the bonds to be purchased by the instant program. The administrator to this program would not distribute such interest for a period of time during which period such funds will be deposited in interest-bearing money market accounts investing in short term securities guaranteed by the U.S. Government, or in an interest-bearing account with the Fund's custodian. Prior to the expiration of such sixty-day period, the administrator will distribute such funds as are available for distribution to the appropriate unit holders as dividends. The interest generated during such interim period will be accumulated for the benefit of the Fund to pay expenses, such as legal and accounting fees, director fees, reports and custodian fees.

In the event all investors in a particular birth year bracket who have invested the same amount have died or have failed to submit any coupons for two successive calendar years, the bonds will be sold and all proceeds distributed to the unit holders' estates, heirs, assignees, pro rata. Since only those unit holders who are living and submit a personally executed guaranteed coupon will be entitled to participate in dividends, the interest allocated to each bracket of investors will be divided among a smaller and smaller number of unit holders as time goes on, and dividends payable to surviving unit holders in each bracket may be expected to increase.

In view of the foregoing, it is an objective of the instant invention to provide a method and apparatus for administering a program to senior citizens for managing and distributing the interest from pooled government bonds.

Still another objective of the instant invention is to provide a method and apparatus for administering a program to senior citizens utilizing income producing bonds, jointly pooled and singularly administered. The program is based upon U.S. Treasury bonds whose resulting interest is distributed to the remainder of living participants while bond maturity value remains payable to the participant or their estate.

Yet still another objective of the instant invention is to provide a method and apparatus providing for the managing of increased income whose benefit is derived upon living, the income derived therefrom depending upon the participants longevity in respect to co-participants during the interest bearing years of the bond.

These and other objects of the invention are accomplished by providing a data processing system which administers a group purchase of government secured bonds, or the like security having 100% guarantee, for pooling the interest derived therefrom while maintaining the security in trust. The pooled interest payable to each living participant during the interest bearing years of the bond and the bond principal delivered to the participant, or his estate, upon maturity.

DETAILED DESCRIPTION OF THE INVENTION

Figure 1:
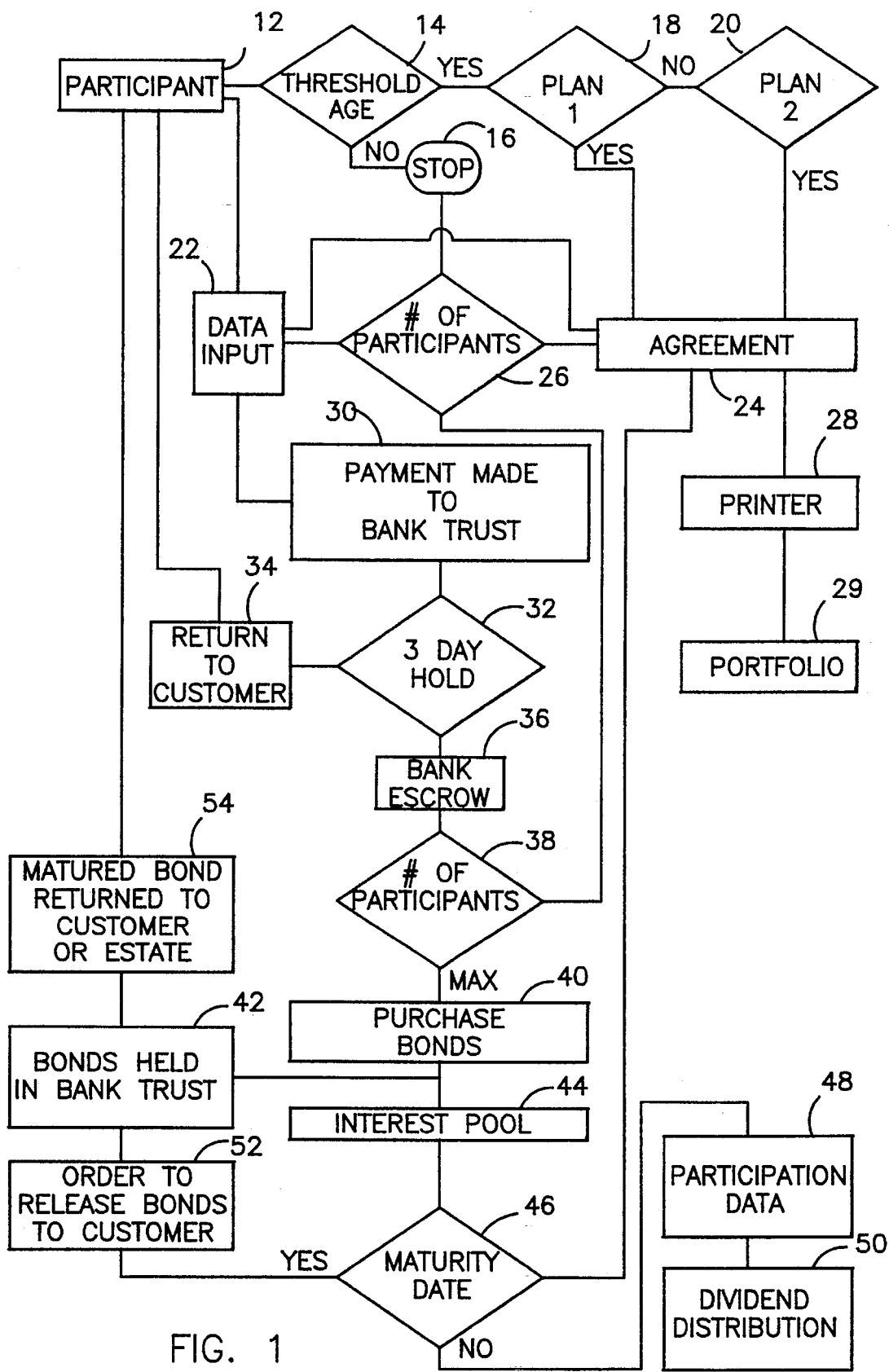
FIG. 1 is a schematic flow diagram of the data processing system of the instant invention.
Figure 2:
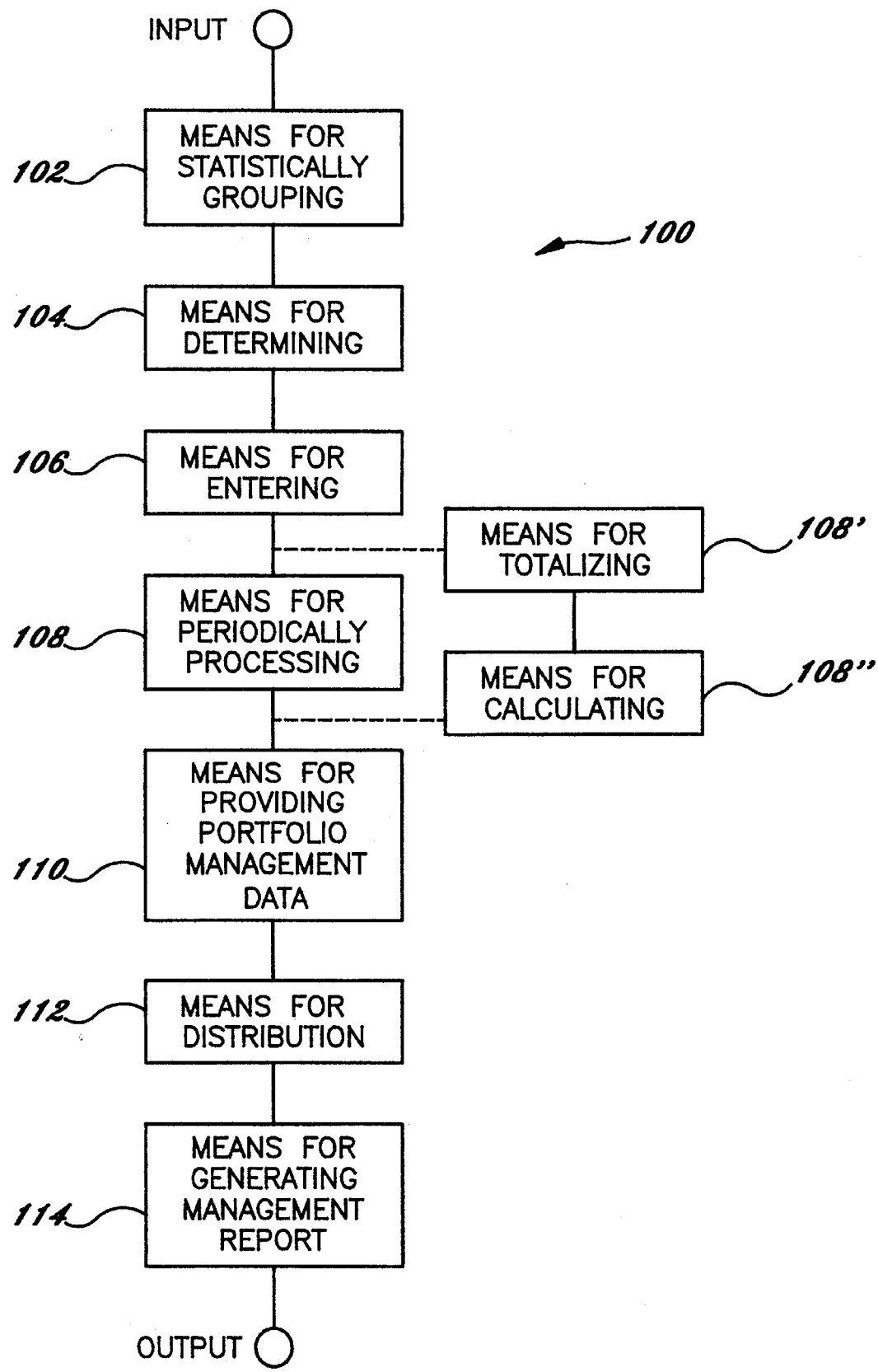
FIG. 2 is a block diagram of the data processing system showing elements of a first embodiment of the invention.

Generally, the data processing system of the instant invention is for administering a program to senior citizens for managing and distributing the interest from pooled government bonds. The program employs a microprocessor based computer system having an input terminal for entry of each customers name, address, estate administrator contact, and the like particulars in order to successfully track each customer during participation. The computer is based at the central offices of the financial institution sponsoring the program with auxiliary branches accessing the program by use of modem coupling. The program prompting the operator to query the customer on age, health, and various term rates of fixed interest security plans available further providing both an internal record and printout of the query questions and responses for the customers' records. Each plan based upon a bond fund unit of various security offering to specific groups of senior citizens having a common age and financial goal. As long as the individual is alive, the individual will share equally in an increasing income stream derived from the interest based on the individual's initial investment. As fellow participants status becomes deceased, the interest is maintained by the pool and delivered only to the living participants in an amount equal to the pool interest divided by the number of living participants. The data processing system includes a number of elements to enable it to function and perform these tasks within the system. A block diagram of the system is generally shown at 100. A means for statistically grouping 102 a predetermined amount of living participants required for participation in a group program is included as well as means for determining 104 a minimum amount of payment data i.e. information required for participation in the program based upon an interest producing security with a fixed maturity date. A means for entering 106 participation payment data and security purchases in the data processing system allows a means for periodically processing 108 to determine the total number of living participants relative to the number of securities purchased and interest producible therefrom. Further, a means responsive to the total participation data 110 for providing portfolio management data allows the interest to be paid out to living participants. A means for distribution 112 to either the participant or participants heirs calculates distribution proceeds upon maturity. Finally, a means for generating 114 produces a management report including the portfolio management data and participation data.

The means for periodically processing 108 the participation data includes a means for totalizing 108' the number of living participants at each interest distribution period and a means for calculating 108" the interest available on the security of each participant and distributing the interest to the living participants. The means for totalizing 108' counts the receipt of coupons signed and guaranteed by the participant.

Figure 3:
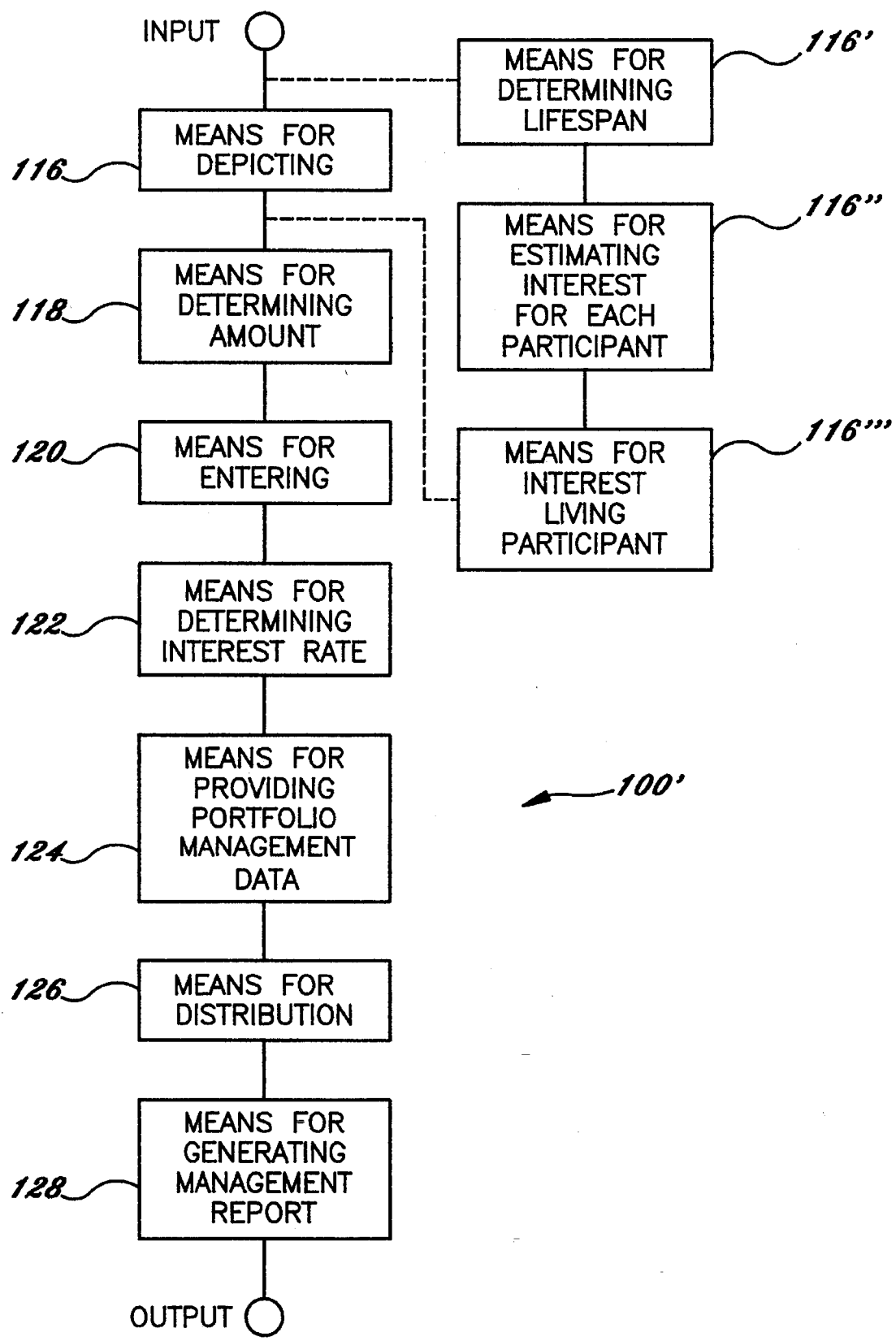
FIG. 3 is a block diagram of the data processing system showing the elements of a second embodiment of the invention.

A second embodiment shown in FIG. 3 illustrates and alternative embodiment 100'. A means for depicting 116 a group size is included, wherein the means for depicting group size 116 includes means for determining statistical life span 116' of group participants, means for estimating the amount of interest produced to each participant 116" for each year of participation and means for estimating the amount of interest produced to each living participant 116'" for each year of participation. A means for determining an amount 118 required for participation in the program based on the interest proceeds from a U.S. Treasury bond is used while a means for entering 120 participation payment data and bond purchases provides needed information to the data processing system. A means for determining the periodic interest rate 122 calculates redemption value of the bond based on the number of participants within the program and a means for periodically processing the participation data determines the total number of living participants relative to the number of bonds purchased and the interest producible from the bonds. A means is used for determining the periodic interest rate 122 and redemption value of the bond based on the number of living participants within the program. A means is responsive to the total participation data 124 for providing portfolio management data so the interest can be paid out to living participants. A means for distribution 126 of bond redemption value to participants or participant's heirs is included while finally a means for generating a management report 128 is used to generate information concerning the portfolio management data and participation data.

With the foregoing overview in mind, the operation of the system is depicted by reference to FIG. 1 wherein a participant transaction is set forth. The operator of the system queries the participant 12 for determination of threshold age 14 as this program is dependent upon age versus security term rate readily apparent later in this description. If the 16 participant is outside the threshold age range the program is stopped as an underage or average participant violates the underlying principal of the plan. If the participant 12 is within the threshold age he may choose from various plans 18 and 20 which are based upon guaranteed security rates and unit levels purchased. For purposes of this embodiment, the preferred plan is based upon a United States 30 year Treasury Bond requiring a minimum threshold age of 60/61 for males and 65/66 for female participation. If the customer agrees to enter the plan, the participant's name, address, age, verification of age document, spouse, estate administrator, and family contacts as well as other data 22, are inputted into the form of agreement 24 together with the determination of the earliest plan available having a level of participation open to additional participants 26. Use of a central computer accessed throughout the country allows a faster closure rate than regional or locally based plans. The information recorded in the computers memory as well as printed 28 into a formal document or portfolio 18 and/or 20 for the participant's signature. The data formulated into a management report including portfolio 29 management data and participation data. An updated copy of the report may be presented to each participant upon dividend distribution described hereafter. Upon signatory acceptance the participant makes a single payment to the plan's bank trustee 30, a federally chartered national bank fiduciary, who holds the payment for a 3-day holding period 32 wherein the customer who decides not to participate is returned the payment 34. After the 3-day period the bank trustee deposits the payment into a bank escrow account 36 to await payment clearance and completion of the minimum level of participation for the chosen plan. When the level of participation that is the number of participants 38 is met, the bank trustee purchases 40 each bond in the names of the participants, or as trustee thereof, wherein the bonds are held in a chartered national bank trust 42 account. The interest from each bond collected and held in an interest pool 44.

Each investor in the program receives a certificate representing his interest in the program, and a book of coupons or certificates which are submitted during the last six months preceding the calendar year in which the distribution is made. Subsequent interest distributions are based on coupons actually received during such period and no unit holder whose coupon is not timely received will be entitled to participate in a distribution. The interest pool 44, less administrative fees, is then distributed to the living participants 50. In accordance with the agreement terms 24, the interest pool 44 is checked at least twice per year for bond maturity. If the bond is not mature, the program queries participation data 48 for participant status. The query based upon written receipt of the last interest payment or telephone contact requested by the participant. If the maturity date 46 of the bond becomes due, the program instructs a release 52 of all bonds held by the bank trustee 42, the matured bond or original capital contribution returned to each participant or their estate for distribution 54 to heirs or beneficiaries.

EXAMPLE 1

An individual who invests $25,000 in a 30 year U.S. Treasury Bond with a 8% guaranteed fixed interest rate will receive $1,800 per year with a limit of $54,000 receivable over the 30 year period. If the individual invests $25,000 in a 30 year U.S. Treasury Bond with a 6.4% guaranteed fixed interest rate under the 200 unit pooled interest program, and lives for 30 years, the participant can expect to receive in excess of $175,000 based upon normal attrition rates of males who participate beginning at age 64/65 and females who participate beginning at age 70/71.

EXAMPLE 2

An individual who invests $10,000 in a 30 year U.S. Treasury Bond with an 8% guaranteed fixed interest rate will receive $800 per year with a limit of $24,000 receivable over the 30 year period. If the individual invests $10,000 in a 30 year U.S. Treasury Bond with a 6.4% guaranteed fixed interest rate under the 200 unit pooled interest program, and lives for 30 years, the participant can expect to receive in excess of $71,000 based upon normal attrition rates of males who participate beginning at age 64/65 and females who participate beginning at age 70/71.

EXAMPLE 3

An individual who invests $100,000 in a 30 year U.S. Treasury Bond with an 8% guaranteed fixed interest rate will receive $8,000 per year with a limit of $240,000 receivable over the 30 year period. If the individual invests $100,000 in a 30 year U.S. Treasury Bond with a 6.4% guaranteed fixed interest rate under the 200 unit pooled interest program, and lives for 30 years, the participant can expect to receive in excess of $700,000 based upon normal attrition rates of males who participate beginning at age 64/65 and females who participate beginning at age 70/71.

EXAMPLE 4

1992-A SENIORS' U.S. TREASURY BOND FUND SOLD AS COMMON STOCK IN UNITS OF $10,000 AND $25,000 FOR A TOTAL STOCK OFFERING OF 50,000,000 (For males born between 1921 and 1932—females born between 1916 and 1927)

The 1992-A Seniors' U.S. Treasury Bond Fund is organized for the purpose of investing in and holding to maturity a fixed portfolio of 30-year U.S. Government bonds. The Bonds will be purchased within five business days of a stock auction and the interest to be realized from such Bonds will be determined at the time of purchase. All interest on the Fund's portfolio will be distributed semi-annually to surviving holders of the Fund's Units.

Over the 30-year life of the Bonds, dividends will be paid out within 60 days of receipt by the Fund's custodian of interest from the Bonds, but only to individuals who have submitted a personally executed coupon during the last six months of the year preceding such dividend. Participation in such dividends will terminate upon an investor's death; the interest from the Fund's Bond portfolio will be distributed only among those investors alive during the last six months of the year preceding such distribution.

The Fund will be divided into up to 12 pools based on life expectancy and amount invested. $10,000 investments by men born in 1921 or 1922 and women born in 1916 or 1917 (such men and women having approximately the same life expectancy) will be placed in one pool, and $25,000 investments by such persons in another; $10,000 investments by men born in 1923 or 1924 and women born in 1918 or 1919 will be placed in a third pool, and $25,000 investments in a fourth; and so on for men and women born in each of the three subsequent two-year periods, according to the amount invested. Unless 200 or more individuals from the same applicable two-year bracket subscribe the same amount during the period of the offering, all subscriptions of that amount from individuals in such bracket will be returned.

|  | Prices to the Public | Underwriting Discount or Commission | Proceeds to the Fund |
| --- | --- | --- | --- |
| Per Share | $5,000.00 | $400.00 | $4,600.00 |
| Total Minimum | $5,000,00 | $400,00 | $4,600,000 |
| Total Maximum | $50,000,000 | $4,000,000 | $46,000,000 |

The Units offered are not redeemable, and there is no market for the Units, nor is one anticipated to develop. The right to participate in dividends will terminate upon death, and may not be transferred or bequeathed. Although investors' interest in the distribution of principal upon liquidation of the Fund may be assigned, an investor's interest in the Fund's income from its Bonds should be viewed as a life estate only (1) Unless at least 200 individuals in the same birth years and subscription amount bracket subscribe prior to the Bond auction and aggregate sales to such qualifying groups exceed $5,000,000, all funds will be returned, without deduction or interest. Alternatively, the offering may be extended until the next Bond auction, deposited in an escrow account at a national bank and trust company, pending purchase of the Bonds, or refund to investors. (2) The Fund will offer the Units through an underwriter and other broker-dealers who are members of the National Association of Securities Dealers, Inc. The underwriter will be entitled to compensation (including wholesale expenses, administrative costs) and commissions on the price of Units sold by participating dealers. (3) Such proceeds are before deduction of an organizational and management fee payable to the Fund's Administrator. All costs incident to organization of the Fund and the offering of the Units (other than commissions, but including filing, printing, legal and accounting fees, and other miscellaneous fees) will be paid by the Fund's administrator out of its fee.

CHART 1

| Based on age, Male 64/65, Female 69/70: | | | | |
| --- | --- | --- | --- | --- |
| UNIT HOLDERS | PAYMENT | INTEREST RATE | $10,000 UNIT | $25,000 UNIT |
| 200 | 1 | 6.4% | 640 | 1,600 |
| 195 | 2 | 6.6 | 656 | 1,640 |
| 190 | 3 | 6.7 | 674 | 1,685 |
| 185 | 4 | 6.9 | 692 | 1,730 |
| 180 | 5 | 7.1% | 711 | 1,778 |
| 174 | 6 | 7.4 | 736 | 1,840 |
| 168 | 7 | 7.6 | 762 | 1,905 |

CHART 1-continued

| Based on age, Male 64/65, Female 69/70: | | | | |
| --- | --- | --- | --- | --- |
| UNIT HOLDERS | PAYMENT | INTEREST RATE | $10,000 UNIT | $25,000 UNIT |
| 162 | 8 | 7.9 | 790 | 1,975 |
| 155 | 9 | 8.3 | 826 | 2,065 |
| 148 | 10 | 8.7% | 865 | 2,163 |
| 141 | 11 | 9.1 | 908 | 2,270 |
| 134 | 12 | 9.6 | 955 | 2,388 |
| 127 | 13 | 10.1 | 1,008 | 2,520 |
| 119 | 14 | 10.8 | 1,076 | 2,690 |
| 111 | 15 | 11.5% | 1,153 | 2,883 |
| 103 | 16 | 12.4 | 1,243 | 3,108 |
| 95 | 17 | 13.5 | 1,347 | 3,368 |
| 87 | 18 | 14.8 | 1,471 | 3,678 |
| 79 | 19 | 16.2 | 1,620 | 4,050 |
| 71 | 20 | 18.0% | 1,803 | 4,508 |
| 65 | 21 | 19.7 | 1,969 | 4,923 |
| 58 | 22 | 22.1 | 2,207 | 5,518 |
| 51 | 23 | 25.1 | 2,510 | 6,275 |
| 44 | 24 | 29.1 | 2,909 | 7,273 |
| 37 | 25 | 34.6% | 3,459 | 8,648 |
| 33 | 26 | 38.8 | 3,879 | 9,698 |
| 29 | 27 | 44.1 | 4,414 | 11,035 |
| 24 | 28 | 53.3 | 5,333 | 13,333 |
| 19 | 29 | 67.4 | 6,739 | 16,848 |
| 14 | 30 | 91.4% | 9,143 | 22,858 |
| | | | $62,498 | $156,245 |

While the Bonds in which the Fund intends to invest are direct obligations of the U.S. Government, it should be noted that the return on a Particular investor's investment will depend on the age to which he or she lives. There can be no reliable prediction as to the survivability of the investors in any particular birth year bracket; because of the limited number of participants, survivability may significantly vary from actuarial tables. Nevertheless, the following tables will give some idea of the effect the passage of time may have on the number of unit holders participating in the Fund's dividends. The following is based on life expectancy tables published by the U.S. Department of Health and Human Services:

TABLE OF SURVIVING UNIT HOLDERS

| Year of Birth Bracket | | Surviving Unit Holders | | | | | | |
| --- | --- | --- | --- | --- | --- | --- | --- | --- |
| men | women | 1992 | 1996 | 2001 | 2006 | 2011 | 2016 | 2021 |
| 1931–1932 | 1926–1927 | 200 | 185 | 161 | 130 | 95 | 60 | 30 |
| 1929–1930 | 1924–1925 | 200 | 183 | 155 | 121 | 84 | 49 | 22 |
| 1927–1928 | 1922–1923 | 200 | 180 | 148 | 111 | 71 | 37 | 14 |
| 1925–1926 | 1920–1921 | 200 | 177 | 141 | 101 | 61 | 29 | 10 |
| 1923–1924 | 1918–1919 | 200 | 173 | 133 | 88 | 49 | 20 | 6 |
| 1921–1922 | 1916–1917 | 200 | 168 | 123 | 78 | 39 | 14 | 3 |

The program maintains all participant files and living status, the living participants provided with the interest of their fellow participants who do not survive the 30 year period. Chart I summarizing Examples 1–3 further providing a unit holder column listing predicting statistical decline in participation with the appreciable amount of interest for distribution to the remaining participants.

It is to be understood that while we have illustrated a particular example of this method and apparatus, it is not to be limited to the specific forms or arrangement herein described and shown. It will be apparent to those skilled in the art that various changes may be made without departing from the scope of the invention and the invention is not to be considered limited to what is shown in the drawings and described in the specification.

What is claimed is:

1. A microprocessor based computer system including computer readable program code stored in a computer readable memory for administering a program to provide a base income to senior citizens, the income of which increases to living participants with full return of investment, which determines payments required for participation in the program and distribution thereof, said system comprising:

a base microprocessor computer system having a memory means, and a modem means for communicating with remote computer terminals;

at least one remote computer terminal having an input means and a modem means for communicating with said base microprocessor computer system;

a predetermined group size of living participants for participation in a group program;

a minimum amount of payment per said living participant required for participation in the program, said minimum payment based on an interest producing security with a fixed maturity date to produce participation payment data;

said at least one remote computer terminal input means and modem means for entering said participation payment data and security purchases in the microprocessor based computer system memory means;

said computer readable program code including means for causing said computer system to periodically process said participation payment data to determine the total number of living participants relative to the number of securities purchased and interest producible therefrom to produce total participation data;

output means responsive to said total participation data for providing portfolio management data output reports so that interest is paid out to the living participants;

means for distribution of security proceeds upon maturity to participants or participant's heirs;

output means for generating a management report including said portfolio management data and said participation data.

2. The microprocessor based computer system of claim 1, wherein said computer readable program code including means for causing said computer system to periodically process said participation data comprises:

means for totalizing the number of living participants at each interest distribution period;

means for calculating the interest available on the security of each participant and distributing the interest to the living participants.

3. The microprocessor based computer system according to claim 2, wherein said means for totalizing counts the receipt of coupons signed and guaranteed by the participant.

4. A microprocessor based computer system including computer readable program code stored in a computer readable memory for administering a program to provide predictable income to senior citizens, the income of which increases to living participants with full return of investment, which determines payments required for participation in the program and distribution thereof, said system comprising:

a base microprocessor computer system having a memory means, and a modem means for communicating with remote computer terminals;

at least one remote computer terminal having an input means and a modem means for communicating with said base microprocessor computer system;

a predetermined group size of individuals for participation in the program;

an amount of money required for participation in the program based on the interest proceeds from a U.S. Treasury Bond;

a data input means for entering participation payment data and bond purchases in the microprocessor computer system to produce participation data;

computer readable program code means for causing said microprocessor computer system to calculate a periodic interest rate and redemption value of said bond based on the number of participants within the program;

said computer readable program code including means for causing said computer system to periodically process said participation data to determine the total number of living participants relative to the number of bonds purchased and interest producible therefrom to produce total participation data;

means for determining the periodic interest rate and redemption value of said bond based on the number of living participants within the program;

output means responsive to said total participation data for providing portfolio management data output reports so that interest can be paid out to the living participants;

means for distribution of bond redemption value to participants or participant's heirs;

output means for generating a management report including said portfolio management data and said participation data.

5. The microprocessor based computer system of claim 4, further comprising:

means for determining the statistical life span of a group of participants;

means for estimating the amount of interest produced to each participant for each year of participation; and, means for estimating the amount of interest produced to each living participant for each year of participation;

wherein said means for determining the statistical life span of a group of participants, said means for estimating the amount of interest produced to each participant, and said means for estimating the amount of interested produced to each living participant determine said predetermined group size.

* * * * *